United States Patent [19]
Kassawat

[11] Patent Number: 5,940,210
[45] Date of Patent: Aug. 17, 1999

[54] COLLAPSIBLE STEREOSCOPIC VIEWER

[76] Inventor: Samer Kassawat, 305 N. Hickorey Branch La., Orange, Calif. 92669

[21] Appl. No.: 08/440,443

[22] Filed: May 12, 1995

[51] Int. Cl.[6] .......................... G02B 27/22; G02B 27/02; G02B 23/00
[52] U.S. Cl. ......................... 359/474; 359/476; 359/408; 359/466; 359/477
[58] Field of Search .................................... 359/474, 466, 359/408, 481, 476, 477, 480

[56] References Cited

U.S. PATENT DOCUMENTS

| 2,368,480 | 1/1945 | McClure | 359/474 |
|---|---|---|---|
| 2,616,333 | 11/1952 | Tinker | 359/474 |
| 2,821,884 | 2/1958 | Austin | 359/474 |
| 2,930,286 | 3/1960 | Rabben | 359/474 |
| 3,734,596 | 5/1973 | Nerlich | 359/474 |

FOREIGN PATENT DOCUMENTS

| 94/28453 | 12/1994 | France | 359/474 |
|---|---|---|---|
| 324455 | 4/1996 | France | 359/474 |
| 877678 | 5/1953 | Germany | 359/474 |

Primary Examiner—Cassandra Spyrou
Assistant Examiner—Audrey Chang
Attorney, Agent, or Firm—Ray A. Ekstrand

[57] ABSTRACT

A collapsible stereoscopic viewer includes a generally rectangular housing formed of parallel sides and top and bottom surfaces all pivotally secured to form a collapsible rectangular. A pair of internal walls are similarly secured between the top and bottom surfaces to form two optical channels within the housing. A pair of lens supports are pivotally coupled to the housing interior and may be secured therein using a tab and slot attachment. Each lens support receives and supports a conventional eyepiece lens. A pair of front walls are pivotally secured within the housing interior and may be locked into a vertical position by a tab and slot arrangement. Each front wall defines an aperture aligned with one of the eyepieces. The housing further includes a pair of downwardly extending curved arms which support a pivotally coupled planar image plane movable between a vertical and horizontal position upon the arms. The entire viewer may be collapsed by pivoting the lens supports and front walls outwardly and collapsing the rectangular housing while pivoting the image plane to a generally coplanar relationship with the collapsed housing and curved arms.

7 Claims, 4 Drawing Sheets

COLLAPSIBLE STEREOSCOPIC VIEWER

FIELD OF THE INVENTION

This invention relates generally to stereoscopic viewers and particularly to those fabricated to provide collapsible structures.

BACKGROUND OF THE INVENTION

Stereoscopic viewers have enjoyed a long history of popularity among a variety of users. Understandably, a great number of stereoscopic viewer designs have been provided. However, all such stereoscopic viewers generally include a housing supporting a pair of spaced apart eyepiece lenses having optical characteristics which focus the user's eyes upon an image plane spaced from the housing. A light emitting aperture is typically provided between the eyepiece lenses and the image plane to provide a source of light for illuminating a picture or other image forming element supported upon the image plane. The viewing of the image through the spaced apart eyepieces provides a stereoscopic or "three-dimensional like" image character. While such stereoscopic viewers are enjoyable, they are typically large and somewhat bulky raising difficulties in storing and transporting the viewers. In addition, the prohibitive size and awkward shape of such stereoscopic viewers often makes them difficult to handle.

In attempting to meet the problems of awkward shape and bulky size of stereoscopic viewers, practitioners in the art have endeavored to provide various folding or collapsible viewers. Such collapsible viewers have in some respects provided improvement in the art. However, they have also typically resulted in structures which are unnecessarily costly and in many instances difficult or cumbersome to assemble or disassemble tending to make such designs unappealing to consumers.

Examples of such prior art stereoscopic viewers have been found in the patent art for many years. For example, U.S. Pat. No. 1,543,188 issued to Poser sets forth a STEREOCAMPIMETER having a support base and vertically extending pedestal upon which a stereo viewer is supported. The stereo viewer includes a pair of optical lens systems and a surrounding hood for the user's forehead. The base further supports a horizontally extending telescoping arm from which a generally planar image support plane is raised. The telescoping arm permits focal length adjustment of the image plane to eyepiece lens distance.

U.S. Pat. No. 858,979 issued to Hammar sets forth an OPTICAL INSTRUMENT having a support base upon which a pair of pivotally supported eyepiece lenses are secured. An image plane is further supported upon the base and positioned in alignment with the pivotally supported eyepieces.

U.S. Pat. No. 3,502,390 issued to Gilmore, Jr. sets forth a DENTAL STEREOSCOPE having an elongated generally rectangular box supporting an image plane at one end and a compound lens eyepiece assembly inset within the opposite end of the box. A center wall separates the optical paths of each eyepiece to the images.

U.S. Pat. No. 2,093,520 issued to Hayashi sets forth a STEREOSCOPE having a pair of trapezoidal prismatic housings commonly coupled to a frame support. The smaller end of the trapezoidal housing support eyepiece lenses while the larger ends support a film strip retainer upon which a transparency is applied. Ambient light from behind the film strips passes through the film strips to the eyepiece.

U.S. Pat. No. 2,083,313 issued to Cardoza sets forth a STEREOSCOPE having a dual eyepiece supporting housing further including a film plane support and an internal battery-powered illumination system.

U.S. Pat. No. 4,726,653 issued to Thaler, et al. sets forth a STEREOSCOPIC VIEWER having a housing supporting an advancing and supporting mechanism for a disk-shaped card carrying a plurality of stereo images. A pair of eyepieces view the pairs of stereo images.

U.S. Pat. No. 4,235,514 issued to Carver sets forth a COLLAPSIBLE STEREOSCOPIC VIEWER AND FILMSTRIP THEREFOR having a generally rectangular stereoscopic viewer supporting a pair of spaced apart lenses and eyepieces and having means for receiving Lo an elongated dual image card which supports a plurality of image pairs movable to and from positions of alignment with the viewer eyepieces.

U.S. Pat. No. 5,017,952 issued to Wheeler sets forth a COMBINATION CAMERA TO PRODUCE MULTIPLE PRINTS AND PRINT VIEWING DEVICE having a housing defining multiple light paths therein together with a film receiving zone, a print receiving zone, a viewing channel and mirror means within the housing to reflect light from an object to pass via one of the light paths to the film at the film receiving zone for exposing film and to reflect light from an illuminated print at the print receiving zone.

While the foregoing described prior art devices have provided improvement in the art and have enjoyed some commercial success, there remains nonetheless a continuing need in the art for evermore improved low cost, convenient to use and effective stereoscopic viewers.

SUMMARY OF THE INVENTION

Accordingly, it is a general object of the present invention to provide an improved stereoscopic viewer. It is a more particular object of the present invention to provide an improved stereoscopic viewer which is conveniently collapsible and may be stored and transported as a flat generally planar structure in its collapsed condition. It is a still more particular object of the present invention to provide a collapsible stereoscopic viewer which is easily and simply transformed from the planar collapsed position to its operational position.

In accordance with the present invention, there is provided a collapsible stereoscopic viewer comprising: a generally rectangular housing having a top, bottom and a pair of sides and a pair of interior walls extending between the top and bottom, the sides and the interior walls being pivotable with respect to the top and bottom to permit the housing to be configurable between an open rectangular position and a flattened generally planar position; a pair of arms each having a first end joined to one of the sides and a second end; a generally planar image plane pivotally secured to the arms proximate the second ends; a pair of lens supports each pivotally secured within the housing, each movable between a first position generally perpendicular to the top and bottom and a second position generally coplanar therewith; a pair of front walls each pivotally secured within the housing, each movable between a first position generally perpendicular to the top and bottom and a second position generally coplanar therewith here; and a pair of lenses supported by the lens supports, the viewer being collapsible to a generally flat configuration by pivoting the pair of lens supports and the pair of front walls outwardly flattening the housing to the planar position, and pivoting the image plane to be substantially coplanar with the housing top.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
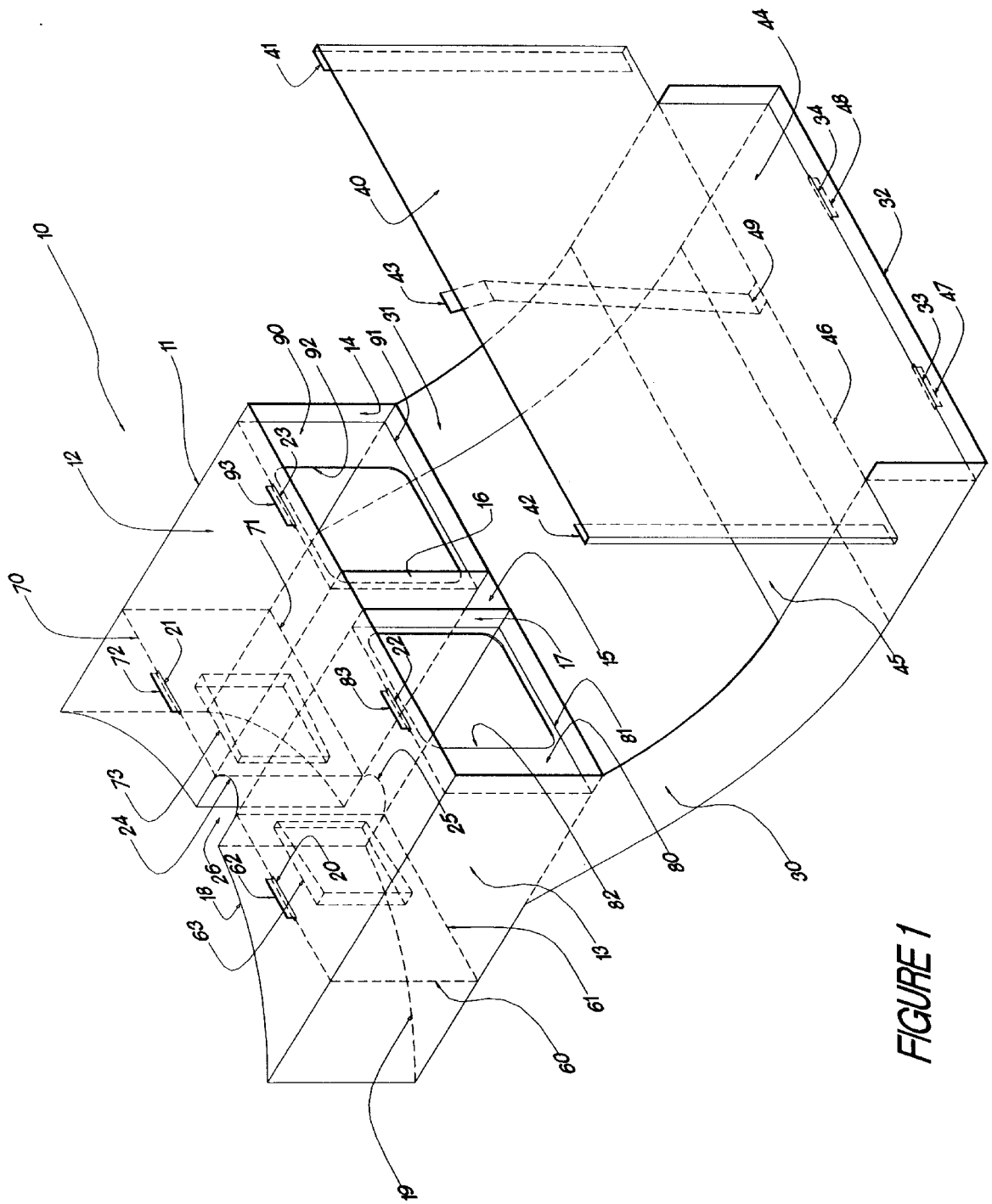
FIG. 1 sets forth a front perspective view of a collapsible stereoscopic viewer constructed in accordance with the present invention in its operational configuration.

FIG. 1 sets forth a front perspective view of a stereoscopic viewer constructed in accordance with the present invention and generally referenced by numeral 10. Viewer 10 includes a generally rectangular housing 11 formed of a planar top 12, a planar bottom 15 and a pair of planar sides 13 and 14. In addition, a pair of generally planar interior walls 16 and 17 are secured between top 12 and bottom 15 in a parallel arrangement. In addition, top 12 defines a notch 24 and a curved edge 18 while bottom 15 correspondingly defines a similar notch 25 and a similar curved edge 19. Interior walls 16 and 17 extend between notches 24 and 25 to edges 18 and 19 to form a space 26 extending vertically within housing 11. Housing 11 further defines a plurality of elongated slots 20, 21, 22 and 23. In accordance with the preferred fabrication of the present invention, housing 11 is formed of a somewhat rigid material such as rigid thin plastic, heavy cardboard, or composite material. In addition, the corner portions of housing 11 formed by the interjunctions of top 12 and bottom 15 with sides 13 and 14 and interior walls 16 and 17 form hinge-like junctions permitting housing 11 to be collapsed in the manner described below in greater detail.

In further accordance with the present invention, a pair of elongated arms 30 and 31 extend downwardly and forwardly from sides 13 and 14 respectively. In the example shown in FIG. 1, arms 30 and 31 are curved. However, it will be apparent to those skilled in the art that other shapes such as angled or slanted arms may alternatively be used. In their preferred form, arms 30 and 31 are integrally formed with sides 13 and 14. A crosspiece 32 comprises a generally planar member extending between the lower front portions of arms 30 and 31 and defining a pair of elongated slots 33 and 34. As described above for housing 11, the junction of crosspiece 32 to arms 30 and 31 is preferably formed to provide a hinge or folding edge to permit collapsing of viewer 10 in the manner described below. A planar support 45 extends between arms 30 and 31 above crosspiece 32.

Viewer 10 further includes a generally planar image plane 40 pivotally secured to the frontal edge of planar support 45 by a hinge 46. Image plane 40 also rests upon the upper edges of arms 30 and 31. Image plane 40 is preferably formed of a rigid material such as molded plastic, heavy cardboard, or composite material having substantial rigidity and joinable to planar support 45 using a conventional "living hinge" type fabrication or its equivalent for hinge 46. Image plane 40 includes a pair of inwardly extending lips 41 and 42 along each vertical side and an upwardly extending center clip 43. The latter is resiliently secured to image plane 40 at an attachment 49. Image plane 40 further includes a downwardly extending generally rectangular lower planar 44 having a pair of elongated tabs 47 and 48 formed on the lower edge thereof. In the operational position shown in FIG. 1, image plane 40 is maintained in its vertical position by the extension of tabs 47 and 48 into slots 33 and 34 of crosspiece 32.

Viewer 10 further includes a pair of substantially rectangular front walls 80 and 90 pivotally secured within the interior of housing 11 by a pair of lower hinge attachments 81 and 91 respectively. In their preferred forms, front walls 80 and 90 extend between interior walls 17 and 16 and sides 13 and 14 respectively and define respective apertures 82 and 92. In addition, front wall 90 defines an elongated tab 83 received within slot 22 of top 12 while front wall 90 defines an elongated tab 93 received within slot 23 of top 12.

Housing 11 further includes a pair of generally planar lens supports 60 and 70 pivotally secured within housing 11 by a pair of hinge attachments 61 and 71 coupled to bottom 15. Lens supports 60 and 70 include respective elongated tabs 62 and 72 extending into slots 20 and 21 of top 12. Lens support 60 receives and supports an eyepiece lens 63. While not seen in FIG. 1, it will be apparent to those skilled in the art and should be understood that lens support 60 is preferably formed of an opaque material and thus a suitable aperture is formed in lens support 60 which is generally coextensive with lens 63. Similarly, it will be apparent that lens support 70 supporting lens 73 is also preferably formed of an opaque material and thus defines an aperture (not shown) which is generally coextensive with lens 73. It will be apparent to those skilled in the art that lens supports 60 and 70 may be combined into a single lens support and that front walls 80 and 90 may be similarly combined to form a common wall defining apertures 82 and 92. In such event, interior wall 16 and 17 may be eliminated.

In operation with viewer 10 in the operational configuration shown in FIG. 1, the user places housing 11 against the user's forehead and facial area such that lenses 63 and 73 are generally aligned with the user's eyes. Thereafter, a suitable image bearing object such as a photograph or the like is placed upon image plane 40 being retained there against by lips 41 and 42 and center clip 43. The alignment of image plane 40 and apertures 82 and 92 of front walls 80 and 90 together with lenses 63 and 73 permits the viewer to independently view each half portion of image plane 40 from each eye through a pair of optical paths. Thus, one eye views one half portion of image plane 40 through lens 63 and aperture 82 while the remaining eye views the remaining half portion of image plane 40 through lens 73 and aperture 92.

Thus in the operational configuration shown in FIG. 1, stereoscopic viewer 10 provides full stereoscopic viewing and further provides a convenient, lightweight but surprisingly rigid and strong structure due to the folding elements being secured by tab and slot arrangements. As mentioned above, in its preferred form viewer 10 is fabricated of a rigid lightweight thin material such as molded plastic or the like which provides a lightweight strong opaque fabricating material. Alternatively, as is also mentioned above, viewer 10 may be fabricated of a rigid cardboard or other composite material having sufficient strength and opaque characteristic.

In accordance with the present invention, viewer 10 may be folded through the sequential folding operation set forth below in FIGS. 2 and 3 to assume the planar collapsed or folded configuration shown in FIG. 4. The folding operation of viewer 10 is set forth below in greater detail in FIGS. 2 and 3. However, suffice it to note with temporary reference to FIG. 4 that the present invention stereoscopic viewer is completely collapsible to a substantially planar member which is easily transported, stored or carried by the user.

Figure 2:
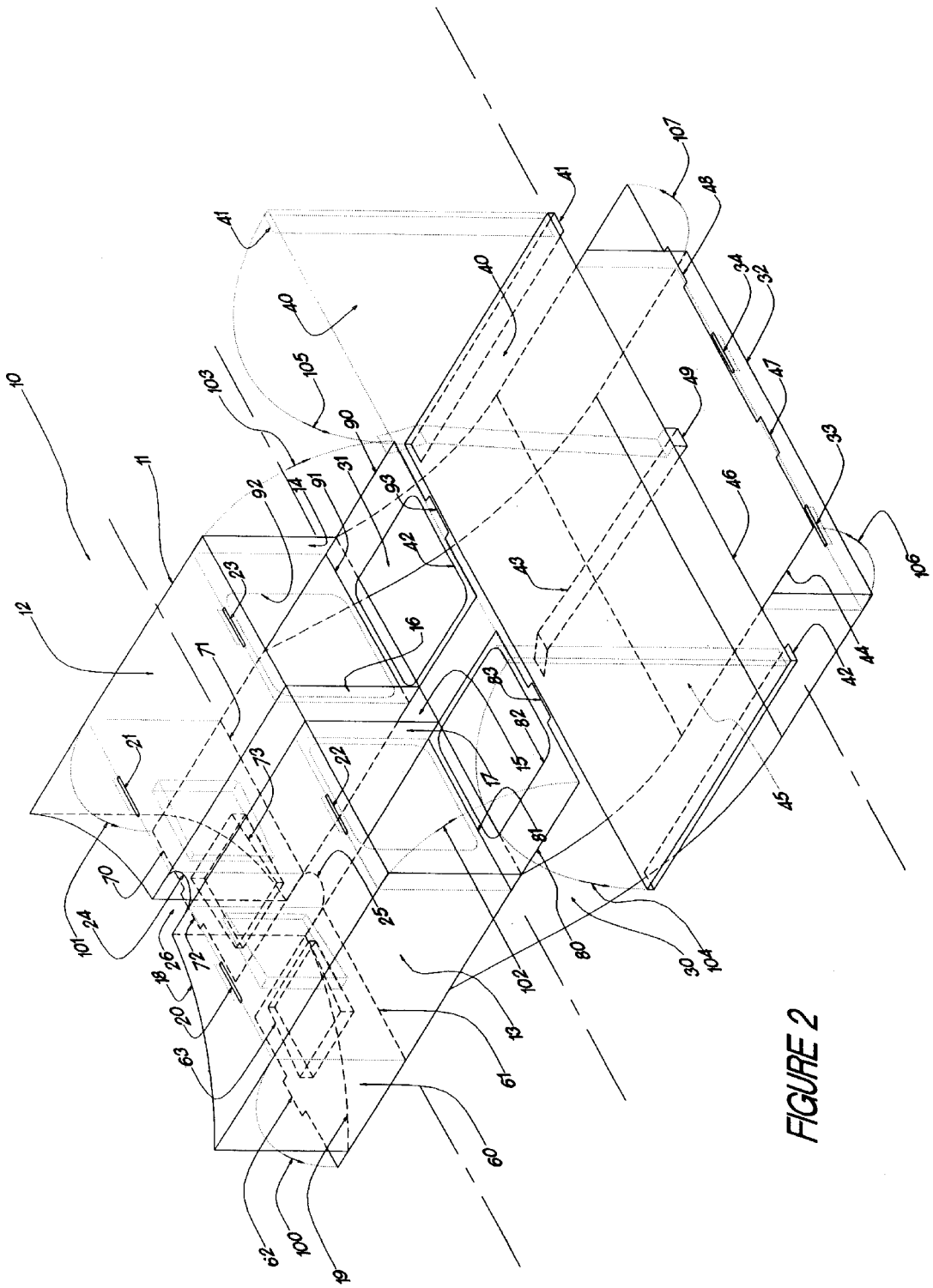
FIG. 2 sets forth a front perspective view of the present invention collapsible stereoscopic viewer showing the initial steps of collapsing the viewer.

More specifically with reference to FIG. 2, the initial steps of folding viewer 10 are set forth in a perspective view in which the elements being moved from their operational configuration are shown in solid-line representation while their previous positions shown in FIG. 1 in the operational position remain in light dotted-line representation for convenient reference. Thus, as described above, viewer 10 includes a housing 11 formed of parallel sides 13 and 14 together with planar top 12 and planar body 15. A pair of internal walls 15 and 16 extend between top 12 and bottom 15. In the position shown in FIG. 2, tabs 83 and 93 have been withdrawn from slots 22 and 23 respectively by flexing top 12 slightly and thereafter front wall 80 having aperture 82 defined therein is pivoted forwardly and downwardly about hinge 81 in the direction indicated by arrow 102. Correspondingly, front wall 90 having aperture 92 formed therein is pivoted forwardly and downwardly about hinge 91 in the direction indicated by arrow 103. Similarly, lens support 60 which as described above supports lens 63 and tab 62 is released from top 12 by flexing top 12 sufficiently to withdraw tab 62 from slot 20 and thereafter lens support 60 is pivoted rearwardly and downwardly about hinge 61 in the direction indicated by arrow 100. Lens support 70 is similarly pivoted by withdrawing tab 72 from slot 21 and thereafter pivoting lens support 70 about hinge 71 in the direction indicated by arrow 101. In addition, tabs 47 and 48 are withdrawn from slots 33 and 34 of crosspiece 32 by flexing crosspiece 32 slightly. This releases image plane 40 and permits image plane 40 to be pivoted about hinge 46 in the direction indicated by arrows 104 and 105. It should be noted that the locked positions of front walls 80 and 90 as well as lens supports 60 and 70 provided the stability and rigidity of housing 11. Thus, upon the pivotal movement of front walls 80 and lens supports 60 and 70, housing 11 is freely collapsible. Similarly, the interlocking of tabs 47 and 48 within slots 33 and 34 of crosspiece 32 provided the rigid configuration of arms 30 and 31 together with crosspiece 32 and image plane 40 in the viewing configuration shown in FIG. 1. Thus, with image plane 40 pivoted to the position shown in FIG. 2, this rigidity is removed and arms 30 and 31 may be readily pivoted with respect to crosspiece 32 during the continued folding of viewer 10.

Figure 3:
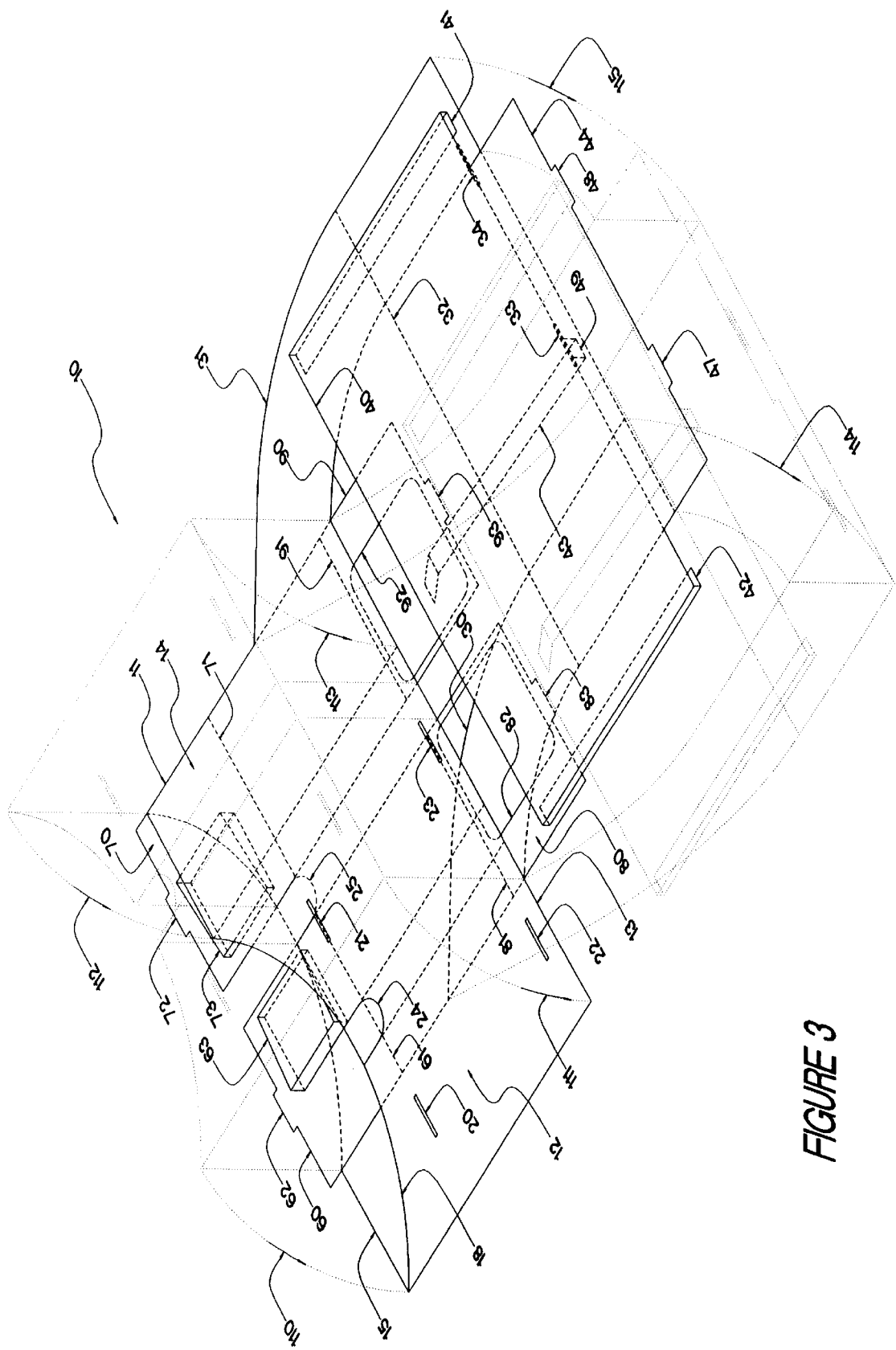
FIG. 3 sets forth a front perspective view of the present invention collapsible stereoscopic viewer showing the final collapsing steps.

FIG. 3 sets forth a perspective view of the present invention viewer as the collapsing or folding process continues. As is described above in FIG. 2, FIG. 3 sets forth solid-line representation of the folding elements of viewer 10 together with dotted-line or ghost-line outlines of each folding element in the previous configuration to aid the reader in following the folding sequence. Thus, the folding or collapsing operation is completed in FIG. 3 and follows the sequential steps set forth above in FIG. 2.

In the configuration of FIG. 3, stereoscopic viewer 10 has been completely folded to its collapsed position. Thus, with lens supports 60 and 70 and front walls 80 and 90 pivoted outwardly in the manner shown in FIG. 2, housing 11 is then folded by pivoting sides 13 and 14 as well as interior walls 15 and 16 with respect to bottom 15 in the manner indicated by arrows 110 through 113. Once this folding operation is complete, top 12 and side 14 overlie bottom 15 and side 13 in a flat configuration. In addition, bottom 15 and side 14 as well as top 12 partially overlie lens supports 60 and 70 and front walls 80 and 90.

As described above, arm 30 extends from and is integrally formed with side 13 while arm 31 extends from and is integrally formed with side 14. As a result, as housing 11 is collapsed or folded in the manner shown in FIG. 3, the pivoting motions of sides 13 and 14 cause arms 30 and 31 to pivot upwardly in the directions indicated by arrows 114 and 115. This upwardly pivotal motion moves arms 30 and 31 to the underside of front walls 80 and 90 and image plane 40. As a result, the various portions of stereoscopic viewer 10 are folded or collapsed into a relatively thin generally planar configuration which facilitates the easy storage and transport of the present invention stereoscopic viewer. It should be noted that the above-described collapsing operation of the present invention stereoscopic viewer is carried forward with relative ease and avoids many of the more complicated assembly operations required of other collapsible stereoscopic viewers.

It will be apparent to those skilled in the art from examination of FIGS. 1 through 3 that the configuration of stereoscopic viewer 10 back to the operational position shown in FIG. 1 is carried forward in a generally reverse process from that shown in FIGS. 1 through 3. That is to say, commencing with the storage or collapsed configuration shown in FIG. 3, the user simply pivots housing 11 back to the generally rectangular configuration shown in dotted-line which in turn pivots arms 30 and 31 downwardly to their operational position. Thereafter, front walls 80 and 90 are pivoted upwardly and into housing 11 to insert tabs 83 and 93 into slots 22 and 23 respectively. Correspondingly, lens supports 60 and 70 are pivoted upwardly into housing 11 to insert tabs 62 and 72 into slots 20 and 21. Finally, image plane 40 is pivoted with respect to hinge 46 to a vertical position and tabs 47 and 48 are inserted into slots 33 and 34 respectively to complete the transformation of viewer 10 from the collapsed position of FIG. 3 to the operational position of FIG. 1. Thus, it will be apparent that the present invention collapsible stereoscopic viewer is readily and easily configured in either its operational position or its flattened collapsed position as the user needs.

Figure 4:
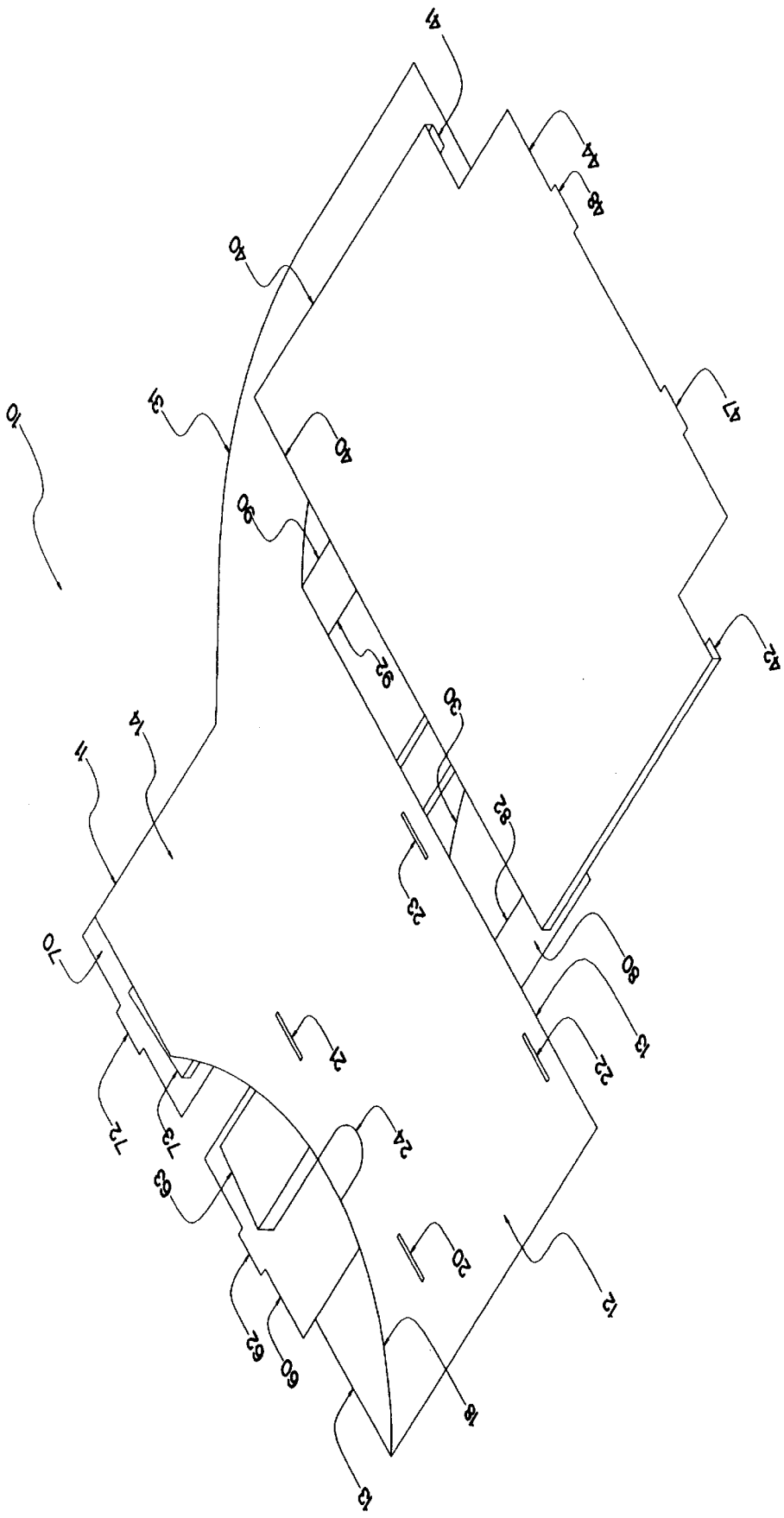
FIG. 4 sets forth a front perspective view of the present invention collapsible stereoscopic viewer in the fully collapsed configuration.

FIG. 4 sets forth a perspective view of the present invention collapsible stereoscopic viewer in its completely collapsed configuration following the operations set forth above in FIGS. 2 and 3. Thus, viewer 10 includes housing 11 which in its flattened position includes top 12 and side 14 overlying side 13 and bottom 15. Housing 11 thus collapsed further overlies portions of lens supports 60 and 70 and front walls 80 and 90. Arms 30 and 31 extend beneath image plane 40 which in turn overlies a portion of front walls 80 and 90 and is generally coplanar with housing 11. The resulting structure as can be seen in FIG. 4 is extremely flat and may readily be placed within virtually any convenient storage apparatus. In addition, the present invention stereoscopic viewer in the collapsed position may be readily inserted into a book or other paged material to provide an extremely convenient addition to a book or paged material.

What has been shown is a collapsible stereoscopic viewer which is readily configured in a flat collapsed storage or transport configuration and which is easily reconfigured into an operational configuration in a simple straightforward manner. The collapsible stereoscopic viewer provided is preferably formed of a thin rigid material such as molded plastic or the like or, alternatively, may be fabricated of rigid cardboard, paper or composite material as the user requires in an given application. The various hinges coupling the pivoting elements of the collapsible viewer may be provided using conventional "living hinge" fabrications or simple folded tab hinges secured using adhesive bonding, sonic welding or other fabrication techniques. The entire structure is fabricated in a low cost manner and lends itself well to high volume mass production manufacturing techniques.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A collapsible stereoscopic viewer for use by a viewer having a pair of eyes, said collapsible stereoscopic viewer comprising:

a generally rectangular housing having a top, bottom and a pair of sides and a pair of interior walls extending between said top and bottom and generally parallel to said sides to form a pair of separate viewing passages for each of said eyes, said sides and said interior walls being pivotable with respect to said top and bottom to permit said housing to be configurable between an open rectangular position and a flattened generally planar position;

a pair of arms each having a first end joined to one of said sides and a second end and each extending forwardly beyond said rectangular housing;

a generally planar image plane pivotally secured to said arms proximate said second ends spaced from said rectangular housing to allow light to fall upon said image plane;

a pair of lens supports each pivotally secured within said housing, each movable between a first position generally perpendicular to said top and bottom and a second position generally coplanar therewith;

a pair of front walls each pivotally secured within said housing, each movable between a first position generally perpendicular to said top and bottom and a second position generally coplanar therewith here; and a pair of lenses supported by said lens supports each in alignment with one of said separate viewing passages, said viewer being collapsible to a generally flat configuration by pivoting said pair of lens supports and said pair of front walls outwardly flattening said housing to said planar position, and pivoting said image plane to be substantially coplanar with said housing top.

2. A collapsible stereoscopic viewer as set forth in claim 1 wherein said housing top defines a plurality of slots and wherein said lens supports and front walls each define extending tabs receivable within said slots to lock said lens supports and said front walls in first positions.

3. A collapsible stereoscopic viewer as set forth in claim 2 further including a crosspiece extending between said second ends of said arms.

4. A collapsible stereoscopic viewer as set forth in claim 3 wherein said crosspiece defines a plurality of slots and wherein said image plane defines a plurality of extending tabs engaging said slots in said crosspiece to lock said image plane in a generally vertical position.

5. A collapsible stereoscopic viewer as set forth in claim 4 wherein said image plane includes retaining means for holding an image-bearing sheet.

6. A collapsible stereoscopic viewer as set forth in claim 5 wherein said arms are each integrally formed with one of said sides.

7. A collapsible stereoscopic viewer for viewing through a pair of viewer eyes, said collapsible stereoscopic viewer comprising:

a collapsible housing foldable between an open position and a flattened position and defining a forward edge and a rearward edge and a pair of interior walls extending between said forward edge and said rearward edge to a pair of separate viewing passages throughout said housing;

a pair of lens supports each supporting a lens and each coupled to said housing at said rearward edge and each foldable between a first position engaging said housing in said open position and a flattened position extending from said housing;

a pair of arm extending from said forward edge of said housing movable with said housing to a generally coplanar relationship in the flattened position of said housing and extending forwardly beyond said forward edge; and a planar image plane pivotally supported by said arms spaced from said forward edge to allow light to fall upon said image plane in said open position and movable between an open position and a flattened position.

* * * * *